(12) United States Patent
Frishman et al.

(10) Patent No.: US 10,846,242 B1  
(45) Date of Patent: Nov. 24, 2020

(54) CONFIGURABLE WAY ALLOCATION FOR CACHE

(71) Applicant: Amazon Technologies, Inc., Reno, NV (US)

(72) Inventors: Ofer Frishman, Hod-Hasharon (IL); Guy Nakibly, Kedumim (IL); Erez Izenberg, Tel-Aviv (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 87 days.

(21) Appl. No.: 15/394,632

(22) Filed: Dec. 29, 2016

(51) Int. Cl.
  *G06F 12/12* (2016.01)
  *G06F 12/128* (2016.01)

(52) U.S. Cl.
  CPC ............ *G06F 12/128* (2013.01); *G06F 12/12* (2013.01); *G06F 2212/1044* (2013.01)

(58) Field of Classification Search
  None
  See application file for complete search history.

(56) References Cited

U.S. PATENT DOCUMENTS

| | | | |
|---|---|---|---|
| 2011/0185032 A1* | 7/2011 | Hiramoto | G06F 9/544 709/212 |
| 2011/0231612 A1* | 9/2011 | Karlsson | G06F 9/383 711/119 |
| 2017/0091108 A1* | 3/2017 | Arellano | G06F 12/0888 |

\* cited by examiner

*Primary Examiner* — Charles Rones
*Assistant Examiner* — Ryan Dare
(74) *Attorney, Agent, or Firm* — Hogan Lovells US LLP

(57) ABSTRACT

Systems and methods in accordance with various embodiments of the present disclosure provide approaches for configurable allocation of ways in a cache. When a packet is received, the packet can be parsed to determine its type and a corresponding operating mode can be looked up. Based on the operating mode, one or more specific ranges of ways may be determined for the packet's data. For example, a first range of ways may be defined to include context data, a second range of ways may be defined to include descriptor data, and a third range of ways may be defined that can include both context and descriptor data. An eviction engine may clear data from and/or store data to a particular way in the cache based on the operating mode.

17 Claims, 6 Drawing Sheets

CONFIGURABLE WAY ALLOCATION FOR CACHE

BACKGROUND

As the use of computer networks increases, more data and types of data are being exchanged between systems. This can mean that different types of packets are being processed over a given time period. Each type of packet may be associated with a different data context and descriptors used during processing of the packets. A cache may be used to store the data contexts and descriptors, improving processing performance of the packets by reducing calls to the main system memory. The data contexts and descriptors may be mapped to an index of the cache using a portion of their addresses in the main memory. This data may further be assigned to one or more ways of that index based on hardware configuration of the cache which is set when the cache is manufactured. However, depending on the system in which the cache is used, such hardware defined allocations may not be the most efficient allocation, which may lead to a high miss rate for more frequently used types of data.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for cache mapping while processing packets. In particular, various embodiments provide approaches for configurable allocation of ways in a cache. Typically, such allocation is set by hardware in a packet processing device (e.g., a packet processor and/or hardware cache) making it so that such allocation cannot be altered after the packet processing device has been manufactured. However, the packet processing device may be used in different systems, having different requirements and/or processing different types of packets. As such, by providing configurable way allocation according to the particular deployment of the packet processing device, more efficient packet processing and cache management may be enabled.

In various embodiments, transaction data may be transmitted over a network in the form of packets. Each packet can be associated with a data context that includes information for processing the packets. Each packet may also be associated with one or more descriptors that indicate where to write data into the system. In some embodiments, when processing a packet, many different descriptors may be used, while an associated data context may be used relatively infrequently. Such usage may result in the data context being evicted due to the high demand for descriptor data, leading to repeated cache misses for the data context. Embodiments define different operating modes for different types of packets (e.g., based on the packet protocol type and whether the packet includes data context or descriptor data). When a packet is received, the packet can be parsed to determine its type and a corresponding operating mode can be looked up. Based on the operating mode, one or more specific ranges of ways may be determined for the packet's data. For example, a first range of ways may be defined to include context data, a second range of ways may be defined to include descriptor data, and a third range of ways may be defined that can include both context and descriptor data. An eviction engine may clear data from and/or store data to a particular way in the cache based on the operating mode.

Figure 1:
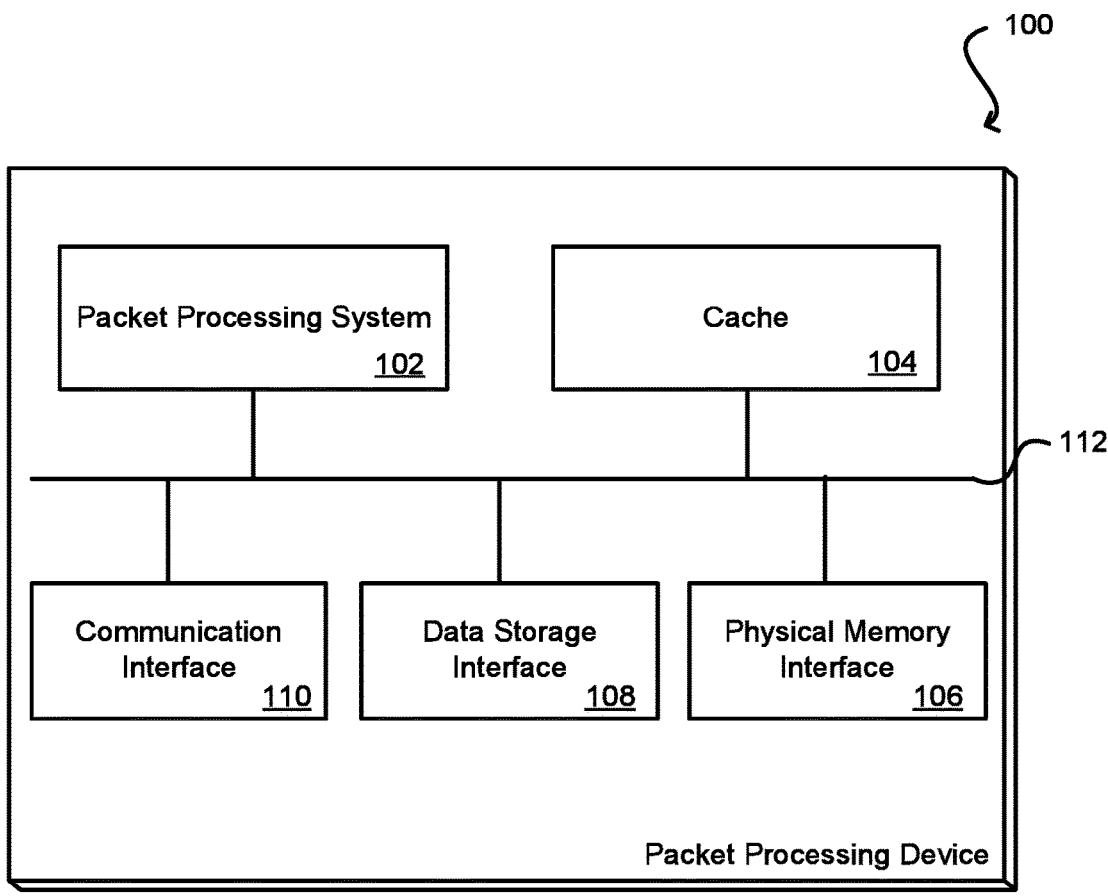
FIG. 1 illustrates an example of a packet processing device, in accordance with various embodiments.

FIG. 1 illustrates an example of a packet processing device 100, in accordance with various embodiments. In accordance with the illustrated embodiment, the packet processing device 100 includes a packet processing system 102, a cache 104, and one or more interfaces including a physical memory interface 106, data storage interface 108, and communication interface 110. The components may be integrated into a single network processor, such as an application-specific integrated circuit (ASIC), field programmable gate array (FPGA), system on a chip (SOC), central processing unit (CPU) or other processor or device. Some embodiments may be implemented as a plurality of distinct components connected by a communication bus 112 or other communication lines. In some embodiments, packet processing device 100 may be incorporated into a network switch, router, network interface card (NIC), or other network device connecting computing systems or data centers.

In various embodiments, packets may be received by packet processing device 100 through communication interface 110. Communication interface 110 may include a network interface such as an Ethernet or InfiniB and port. The packets may include various types of packets, such as network packets, storage packets, user packets, etc. Each packet may be formatted differently based on the protocol in use, such as IPv4 plus TCP, UDP, remote direct memory access (RDMA), or other protocol. Packet processing system 102 can process the packets. Packet processing system 102 can include one or more processors, including single or multi-core processors. The processors may include general purpose processors or specialized processors, such as network processors. In various embodiments, packet processing system 102 may include separate subsystems for processing ingress packets and egress packets. In some embodiments, cache 104 may be part of packet processing system 102 (e.g., on-chip cache) or may be accessible to packet processing system 102.

Cache 104 may be an N-way set associative cache. In various embodiments, cache 104 may be used in the processing of ingress packets, received through communication interface 110. As discussed, each ingress packet may be associated with (e.g., have affinity to) one or more data contexts. The data contexts can be requested from physical memory, through physical memory interface 106, or from disk, through data storage interface 108, and stored in the cache 104. By maintaining the data contexts in the cache, ingress packets can be processed more efficiently, by reducing latency introduced by fetching the data contexts from memory for each packet. In an N-way set associative cache, a location in main memory can be cached in one of N locations in the cache. Data may be transferred from the main memory to the cache in fixed size blocks called cache lines. As such, in an N-way set associative cache, each cache line can be allotted to N different locations. A pointer to the physical location in the cache can include an index and way number. The index is usually determined based on the address of the portion of the main memory being cached. In some embodiments, the way number may be set by the cache, a cache controller, or other hardware or software.

In various embodiments, a data context associated with a type of packet may include a scatter gather list (SGL), a queue ring, or other structure. As an example, a queue ring can be thought of as containing a number of slots wherein each slot is a data structure that corresponds to an I/O operation. Each I/O operation may be associated with data from multiple memory pages. Accordingly, each data structure in the ring buffer contains a set of pointers to the memory pages for the I/O operation, as well as any metadata associated with the I/O operation. This data structure may be stored in the main memory in contiguous address spaces. However, when stored in cache 104, these contiguous memory addresses corresponding to the data context would be stored in consecutive lines in the cache. This may lead to a large portion of the cache being blocked off for one data context, or potentially having portions of the data context evicted as other types of packets are processed and their data contexts are added to the cache.

Figure 2:
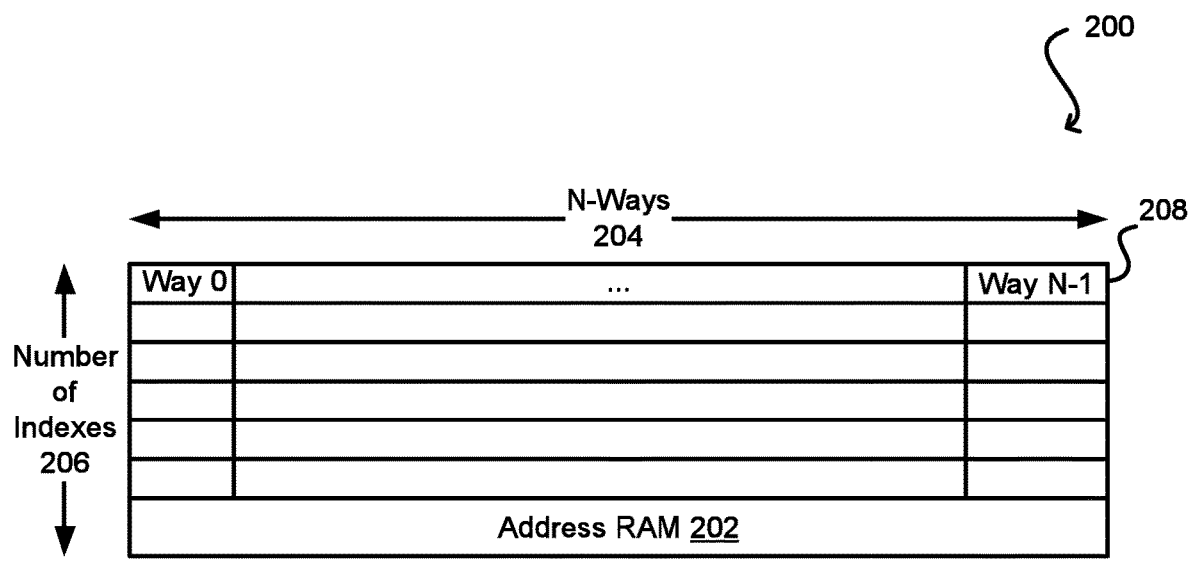
FIG. 2 illustrates an example of a cache structure, in accordance with various embodiments.

FIG. 2 illustrates an example of a cache structure 200, in accordance with various embodiments. It should be understood that reference numbers for like components may be carried over between figures for purposes of explanation, but this should not be interpreted as limiting the scope of the various embodiments. As discussed, a cache 200 may store data contexts for use in processing different types of packets received by a packet processing device. Cache 200 may be an N-way set associative cache. As shown, cache 200 may be organized into an address space in RAM 202 (such as SRAM), which includes a plurality of ways 204 and a plurality of indexes 206. In an N-way set associative cache, a location in main memory can be cached in one of N locations in the cache. Data may be transferred from the main memory to the cache in fixed size blocks called cache lines or ways. As such, in an N-way set associative cache, each cache line can be allotted to N different locations, from way 0 to way N−1 208. A pointer to the physical location in the cache can include an index and a line or way number. The index in the cache may be determined based on the address of the portion of the main memory being cached.

As discussed, in various embodiments different operating modes may be defined for different types of packets (e.g., based on the packet protocol type and whether the packet includes data context or descriptor data). When a packet is received, the packet can be parsed to determine its type and a corresponding operating mode can be looked up. Based on the operating mode, one or more specific ranges of ways may be determined for the packet's data. For example, a first range of ways may be defined to include context data, a second range of ways may be defined to include descriptor data, and a third range of ways may be defined that can include both context and descriptor data. The operating modes may be defined in firmware or through a device driver, enabling the way allocation of the cache to be reconfigured depending on the types of traffic being processed by the cache. Transaction data may be transmitted over a network in the form of packets. Each packet can be associated with a data context that includes information for processing the packets. Each packet may also be associated with one or more descriptors that indicate where to write data into the system. In some embodiments, when processing a packet, many different descriptors may be used, while an associated data context may be used relatively infrequently. Such usage may result in the data context being evicted due to the high demand for descriptor data, leading to repeated cache misses for the data context.

Figure 3:
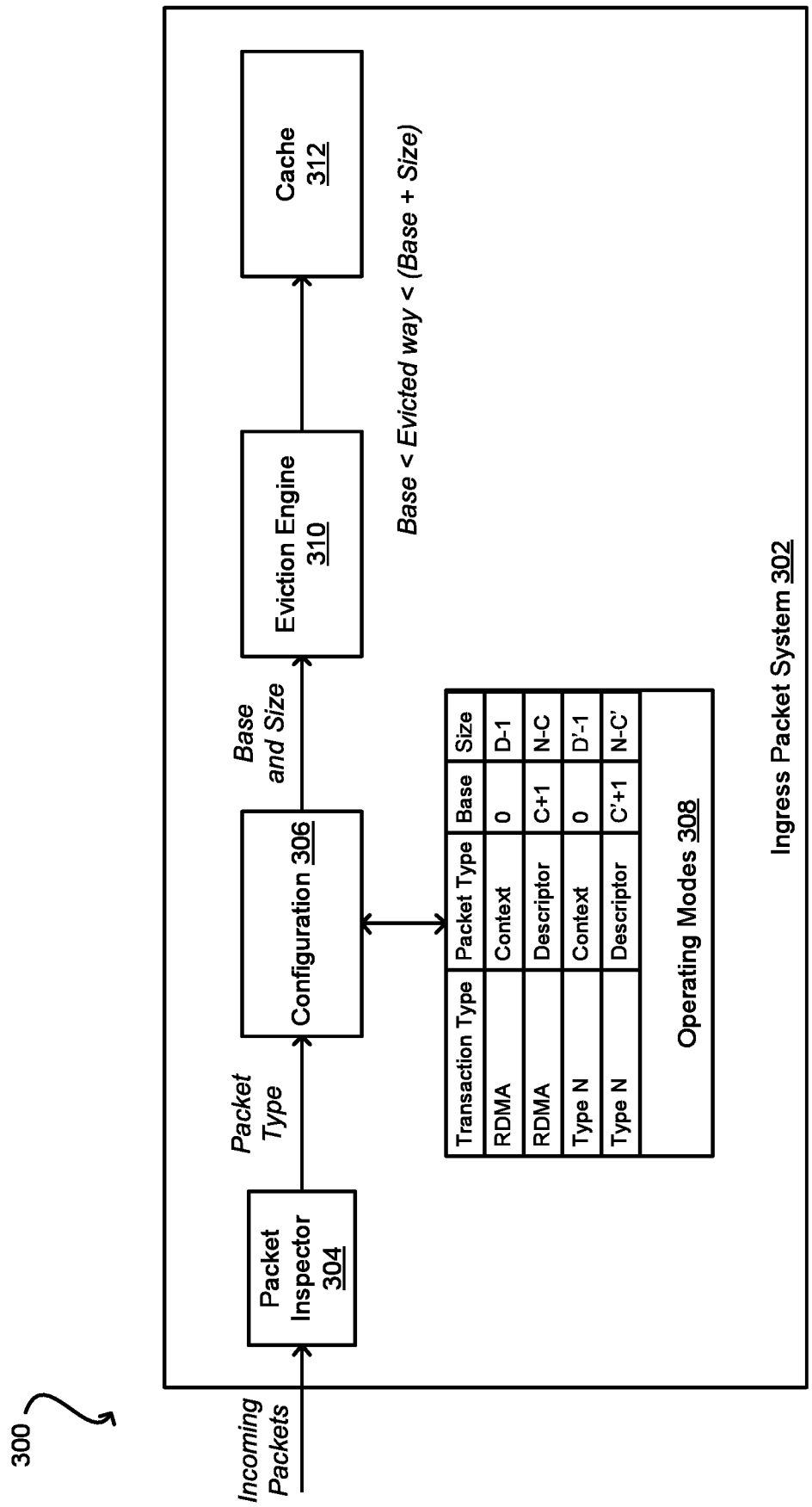
FIG. 3 illustrates an example system for configuring way allocation in a cache, in accordance with various embodiments.

FIG. 3 illustrates an example system 300 for configuring way allocation in a cache, in accordance with various embodiments. It should be understood that reference numbers for like components may be carried over between figures for purposes of explanation, but this should not be interpreted as limiting the scope of the various embodiments. As shown in FIG. 3, an ingress packet system 302 may receive incoming packets. Ingress packet system 302 may represent packet processing system 102, a subsystem of packet processing system 102, or a separate processor or chip. Each incoming packet may be processed through a pipeline as shown.

A packet inspector 304 can receive an incoming packet and determine a packet type. For example, each packet may have an attribute that identifies whether the packet is a context packet or a descriptor packet. In some embodiments, the protocol of the packet may be indicated by a protocol attribute, where different protocols may be indicated by different values. Packet inspector 304 may identify the type of protocol using the protocol attribute. Additionally, packets may also have other attributes that may be extracted by packet inspector 304. For example, storage or RDMA packets may include a command attribute; a network packet might have a priority attribute, function number; etc. Packet inspector 304 may pass the packet type and other attribute data to configuration module 306.

Configuration module 306 can determine a way allocation for the packet type. Way allocations may be defined in one or more operating modes 308. The operating modes may be defined prior to installation of the cache and packet processing device. For example, a device driver or firmware may be configured for one or more protocol types and packet types. As shown in FIG. 3, operating modes 308 can include a table or other data structure indexed by transaction or protocol type which may define a base value and size value for each protocol type and packet type combination. For example, protocol type RDMA can include context and descriptor packets. The base value for RDMA context packet is defined as way 0 and the size is defined as D−1. As such, context data may be allocated to any of ways 0 to D−1. RDMA descriptor packets are defined to have a base value of C+1 and a size of N—C. As such, descriptor data may be allocated to any of ways C+1 to N−1. The base and size values define the way allocation for a given index. The example base and size values for RDMA packets results in an index being divided into three sections: one for context only, one for descriptors only, and a shared section. For example, the context-only section spans ways 0 to C and the descriptor-only section spans ways D to N−1. The overlapping section, spanning ways C+1 to D−1 is shared by both context and descriptor data. This is illustrated further with respect to FIG. 4. In some embodiments, an operating mode associated with a given protocol type may be defined at any time prior to receiving a packet of that protocol type.

When a packet has been received and a corresponding base and size value have been determined, the packet and/or corresponding packet data can be stored in cache 312. For example, a given packet may be associated with packet data including context and/or descriptor data. This packet data may be stored in the cache in the ranges corresponding to the type of data (e.g., context data or descriptor data). In various embodiments, the packet can be stored in any way of a given index that falls within the region defined by the base and size values. In some embodiments, data may be stored in consecutive ways until all ways in the region are filled. Additionally, or alternatively, other storage algorithms may be used to determine the next way in which to store the packet data.

In some embodiments, if all of the ways in the region defined by the base and size are full, an eviction engine 310 can determine which way to evict to store the packet or packet data. Eviction engine 310 can treat all ways outside of the region defined by the base and size as locked, and not able to be evicted. Accordingly, eviction engine 310 can apply one or more eviction algorithms to the region defined by the base and size values. For example, eviction engine 310 can identify the least recently used (LRU) way within the cache region to evict. This may be determined based on timestamp data or other metadata that indicates when an element was added to the cache. In some embodiments, the least frequently used (LFU) way can be evicted. The frequency with which a given way is accessed (e.g., read or written) may be monitored and stored and used to identify the most and least frequently accessed ways. The LFU may then be evicted by eviction engine 310. In some embodiments, a first in first out (FIFO) algorithm or last in first out (LIFO) algorithm may be used to identify a way to evict. Regardless of the particular eviction algorithm used, the evicted way falls within the range of ways between the base value and the way equal to the base value plus the size value.

Although embodiments are described herein with respect to remote direct memory access (RDMA) packets, any packet types that utilize a data context may be used. These packets may include storage packets, management packets, and network packets. Packets of various protocols may also be used, such as IPv4 plus TCP, UDP, or other protocol. Additionally, if multiple data types are utilized in the processing of a particular type of packet, multiple overlapping ranges of ways may be defined in the configuration information.

Accordingly, embodiments enable a cache's ways to be allocated dynamically after the cache and/or packet processing device have been manufactured and released. As discussed, way allocation may be set by hardware in a packet processing device (e.g., a packet processor and/or hardware cache) such that the allocation cannot be altered after the packet processing device has been manufactured. However, the packet processing device may be used in different systems, having different requirements and/or processing different types of packets. By providing configurable way allocation according to the particular deployment of the packet processing device (e.g., by updating the operating modes 308), more efficient packet processing and cache management may be enabled. Additionally, this allows for the packet processing device to be configured for processing new types of packets that did not exist at the time of the device's manufacturing. This enables the packet processing device to be customized for different protocol types and systems to which it may be installed or deployed. For example, a system to which such a packet processing device may be installed may include a small number of transaction identifiers (e.g., data contexts) and descriptor rings including a large number of descriptors. When the descriptor rings are stored in memory, they may be divided into many smaller pieces, each associated with a descriptor. As such, the expected descriptor traffic of this system will be much larger than the context traffic. Accordingly, the packet processing device may be configured to allocate more ways to descriptors and fewer ways to data contexts.

Figure 4:
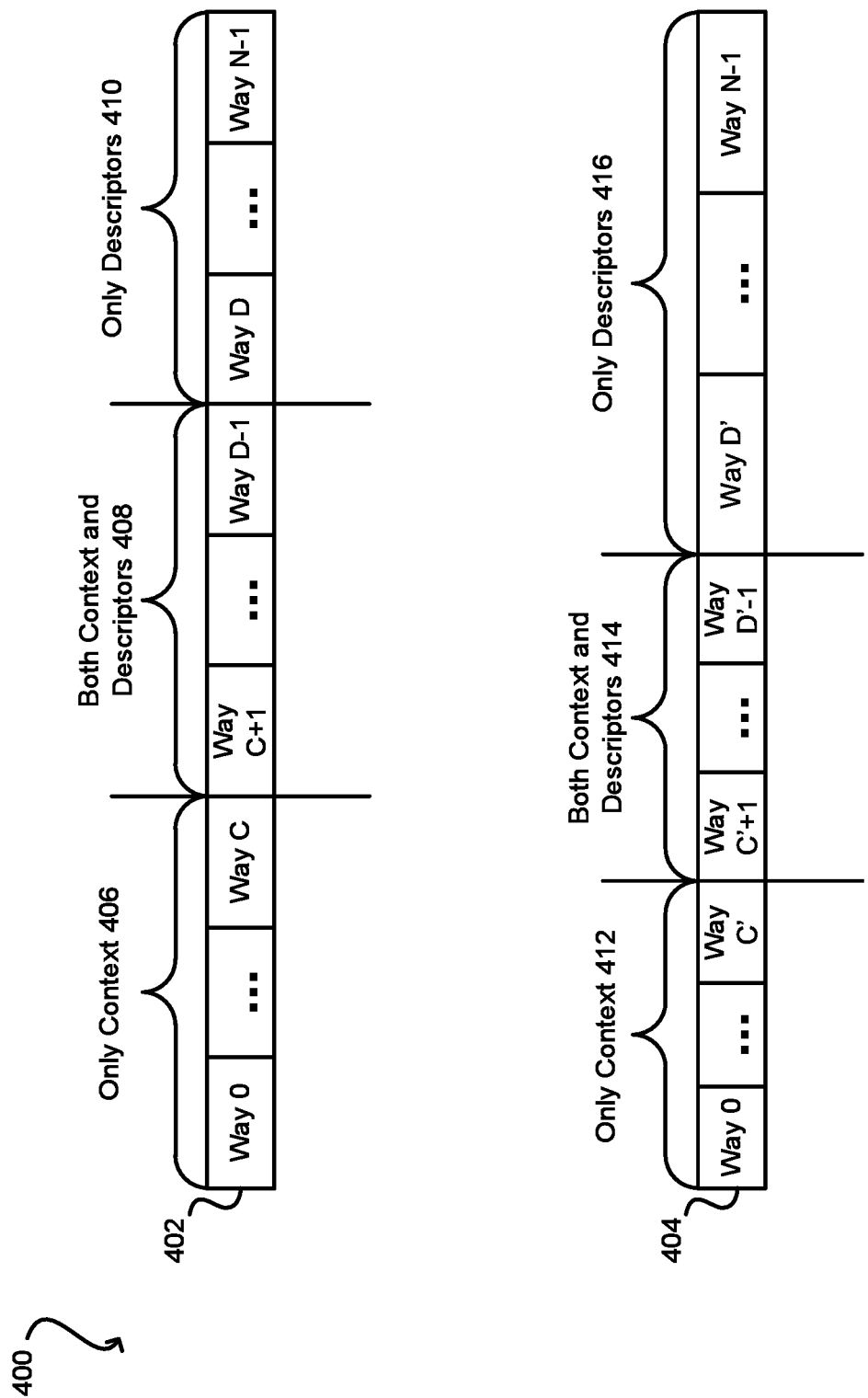
FIG. 4 illustrates example way allocations of an index of a cache, in accordance with various embodiments.

FIG. 4 illustrates example way allocations 400 of an index of a cache, in accordance with various embodiments. As shown in FIG. 4, a cache index 402 may be divided into three sections: a data context only section 406, a descriptor only section 410, and a shared section 408 that can include both data context data and descriptor data. Each section 406, 408, 410 may include a configurable number of ways for that index. As discussed, in an N-way cache, each index may include N-ways. The ranges for each section may be defined in firmware (e.g., updateable firmware) or in a device driver by specifying a context value C and a descriptor value D. Accordingly, context section 406 can include ways 0 to C, descriptor only section 410 can include ways D to N−1, and the shared section may include ways C+1 to D−1. As shown in FIG. 4, index 402 includes approximately equal sized sections. Such allocation may be appropriate for some uses (e.g., for some types of traffic processed by the cache) however, for others that rely on more descriptor data or more data context data, such equal apportionment may lead to increased cache misses as the increased traffic for one type of data causes the other type of data to be evicted.

As such, cache index 404 shows a second way allocation. In this example, data context only section 412 includes ways 0 to C', where C' is less than C. Descriptor only section 416 includes ways D' to N−1, where D' is less than D. Shared section 414 includes ways C'+1 to D'−1. Accordingly, the number of ways allocated to descriptors in index 404 is greater than the number of ways allocated to descriptors in index 402, and the number of ways allocated to context in index 404 is less than the number of ways allocated to context in index 402. For the type of traffic associated with the allocation of index 404, an increase in the number of ways allocated to descriptors may lead to fewer cache misses for both descriptors and data context. For example, smaller data contexts being requested less frequently may be stored in ways 0 to C, with room to expand to way D−1 if needed, while more descriptors being called more frequently can be accommodated by the larger descriptor section 416, leading to fewer evictions of context data.

Figure 5:
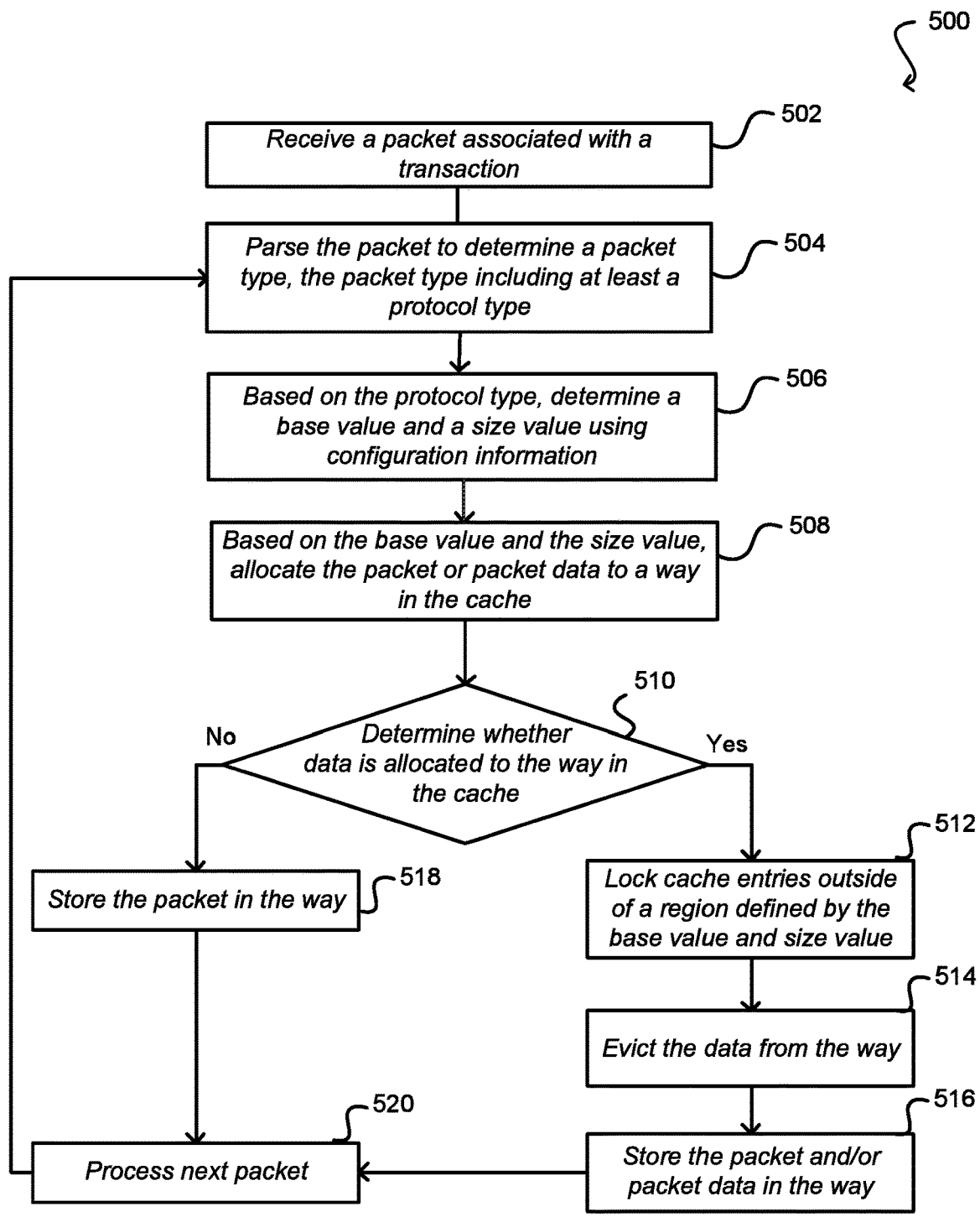
FIG. 5 illustrates an example process for way allocation, in accordance with various embodiments.

FIG. 5 illustrates an example process 500 for way allocation, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in FIG. 5, a packet associated with a transaction may be received 502. The packet may be of a particular protocol and may be associated with packet data (e.g., context data and/or descriptor data). The packet can be parsed 504 to determine the packet data and protocol type. Based on the protocol type, a base value and a size value can be determined 506 using configuration information. For example, a device driver or firmware may define different operating modes based on the packet type and protocol type. Each operating mode may define a base value corresponding to a specific way, and a size value, corresponding to a number of consecutive ways from the base value. Together, the base value and size value define a range of ways in a given index in the cache. Using multiple base and size values for different types of data, multiple ranges of ways may be defined. In some embodiments, these ranges may overlap, such that some ranges include only a particular type of data, while other ranges may be shared among different types of data. Based on the base value and size value, the packet can be allocated 508 to a way in the cache. For example, the first empty way within the range defined by the base and size values may be used to allocate the packet. In some embodiments, the last written to way may be tracked and used to determine the next consecutive way to be written to in the cache. The system can determine 510 whether data is already allocated to the way. If so, cache entries outside of the range defined by the base and size values may be locked 512. Data may then be evicted 514 from the way and the packet can be stored 516 in the now available way. If data has not already been allocated to the way, the packet or the corresponding packet data (e.g., descriptor data or context data) can be stored 518 in the way. After the packet has been stored to the determined way in the cache, the next packet can be processed 520, and processing may return to 504.

Figure 6:
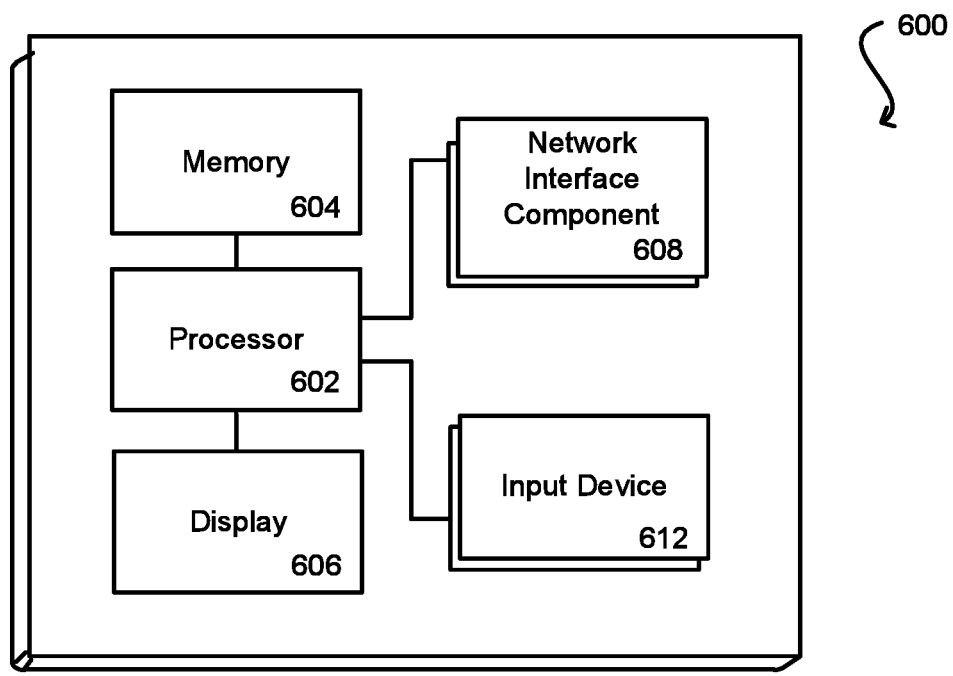
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
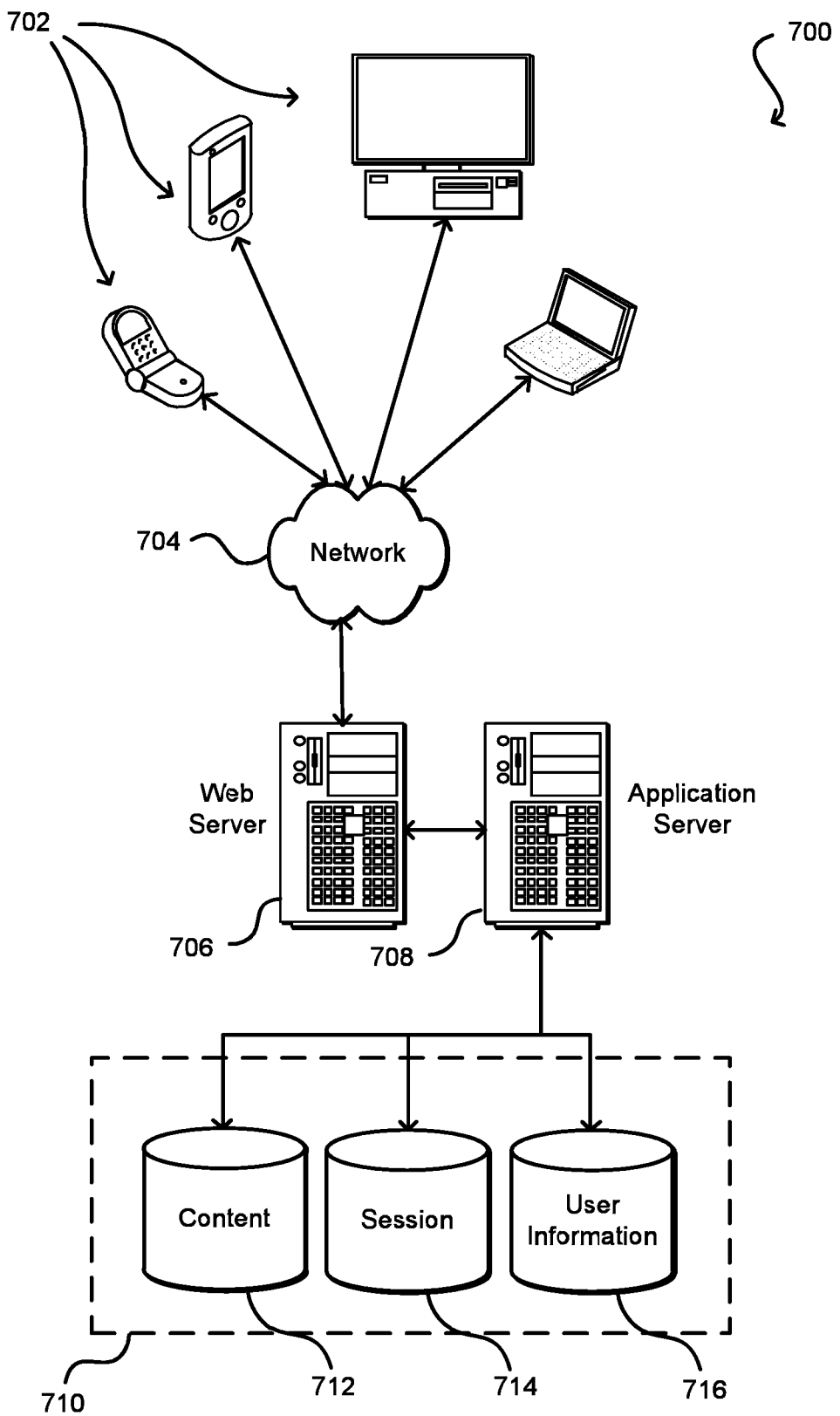
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device 612 (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
receiving a packet, the packet associated with packet data, a packet type, and a protocol type, the packet data including context data and descriptor data, the packet type identifying the packet as including context data or descriptor data to be processed;
parsing the packet to determine the packet data, the packet type and the protocol type;
determining an operating mode based on the protocol type and the packet type, the operating mode including a base value and a size value, wherein the base value and size value define a plurality of ranges of ways in an index of a cache, wherein the plurality of ranges of ways include a first range configured to store a first packet type and a second range configured to store a second packet type;
based, at least in part on the base value and the size value included in the operating mode, determining a way in the cache to which to store the packet or the packet data;
determining that data is allocated to the determined way in the cache;
locking cache entries outside the range of ways defined by the base value and the size value;
evicting the data from the determined way; and
storing the packet or the packet data in the determined way.

2. The method of claim 1, further comprising:
receiving a second packet, the second packet associated with a second protocol type;
parsing the second packet to determine the second protocol type;
determining an operating mode for the second protocol type;
based on the operating mode for the second protocol type, determining a second way in the cache to which to store the second packet;
determining that data is not allocated to the second way; and
storing the second packet in the second way.

3. The method of claim 1, wherein the operating mode is defined in firmware.

4. The method of claim 1, wherein the base value defines a way number and the size value defines a number of ways.

5. A computer-implemented method comprising:
receiving a packet for a transaction, the packet associated with a packet type, the packet type identifying the packet as including context data or descriptor data to be processed;
determining an operating mode for the packet based on the packet type, the operating mode associated with the packet type and a protocol type for the packet, and the operating mode defining, based at least in part on a base value and a size value included in the operating mode, a plurality of ranges of ways in an index in the cache, wherein the plurality of ranges of ways include a first range configured to store a first packet type and a second range configured to store a second packet type;
based on the operating mode, determining a way in the cache to which to store the packet;
upon determining that data is allocated to the determined way in the cache,
locking cache entries outside of a range of ways defined by the operating mode;
evicting the data from the determined way; and
storing the packet in the determined way.

6. The computer-implemented method of claim 5, wherein the operating mode is defined in firmware.

7. The computer-implemented method of claim 6, further comprising: changing the operating mode by updating the firmware.

8. The computer-implemented method of claim 5, wherein determining a way in the cache to which to store the packet further comprises:
identifying the way in the range of ways using an eviction algorithm.

9. The computer-implemented method of claim 8, wherein the eviction algorithm includes a first in first out algorithm, a least frequently used algorithm, or a least recently used algorithm.

10. The computer-implemented method of claim 5, further comprising:
receiving a second packet, the second packet associated with a second packet type and a second protocol type; and
determining a second operating mode for the second packet.

11. The computer-implemented method of claim 10, wherein the second operating mode defines a second range of ways to which the second packet is able to be stored in the cache.

12. The computer-implemented method of claim 5, wherein the first packet type comprises data context packets and the second packet type comprises descriptor packets.

13. A computing device, comprising:
at least one processor; and
memory including instructions that, when executed by the processor, cause the computing device to:
receive a packet associated with a transaction and a packet type, the packet type identifying the packet as including context data or descriptor data to be processed;
determine an operating mode based on the packet type, the operating mode associated with the packet type and a protocol type for the packet, and the operating mode defining, based at least in part on a base value and a size value included in the operating mode, a plurality of ranges of ways in an index in the cache, wherein the plurality of ranges of ways include a first range configured to store a first packet type and a second range configured to store a second packet type;
based on the operating mode, determine a way in the cache to which to store the packet;
upon determining that data is allocated to the determined way in the cache,
lock cache entries outside of a range of ways defined by the operating mode;
evict the data from the determined way; and
store the packet in the determined way.

14. The computing device of claim 13, wherein the instructions, when executed, further causing the computing device to:
receive a second packet, the second packet associated with a second packet type and a second protocol type; and determine a second operating mode for the second packet, wherein the second operating mode defines a second range of ways to which the second packet is able to be stored in the cache.

15. The computing device of claim 13, wherein the computing device is a system on a chip (SOC), a central processing unit (CPU), an application-specific integrated circuit (ASIC), or a field programmable gate array (FPGA).

16. The computing device of claim 13, wherein the computing device is included in a network device or a storage device.

17. The computing device of claim 13, further comprising updateable firmware that defines the operating mode.

* * * * *